UNITED STATES PATENT OFFICE.

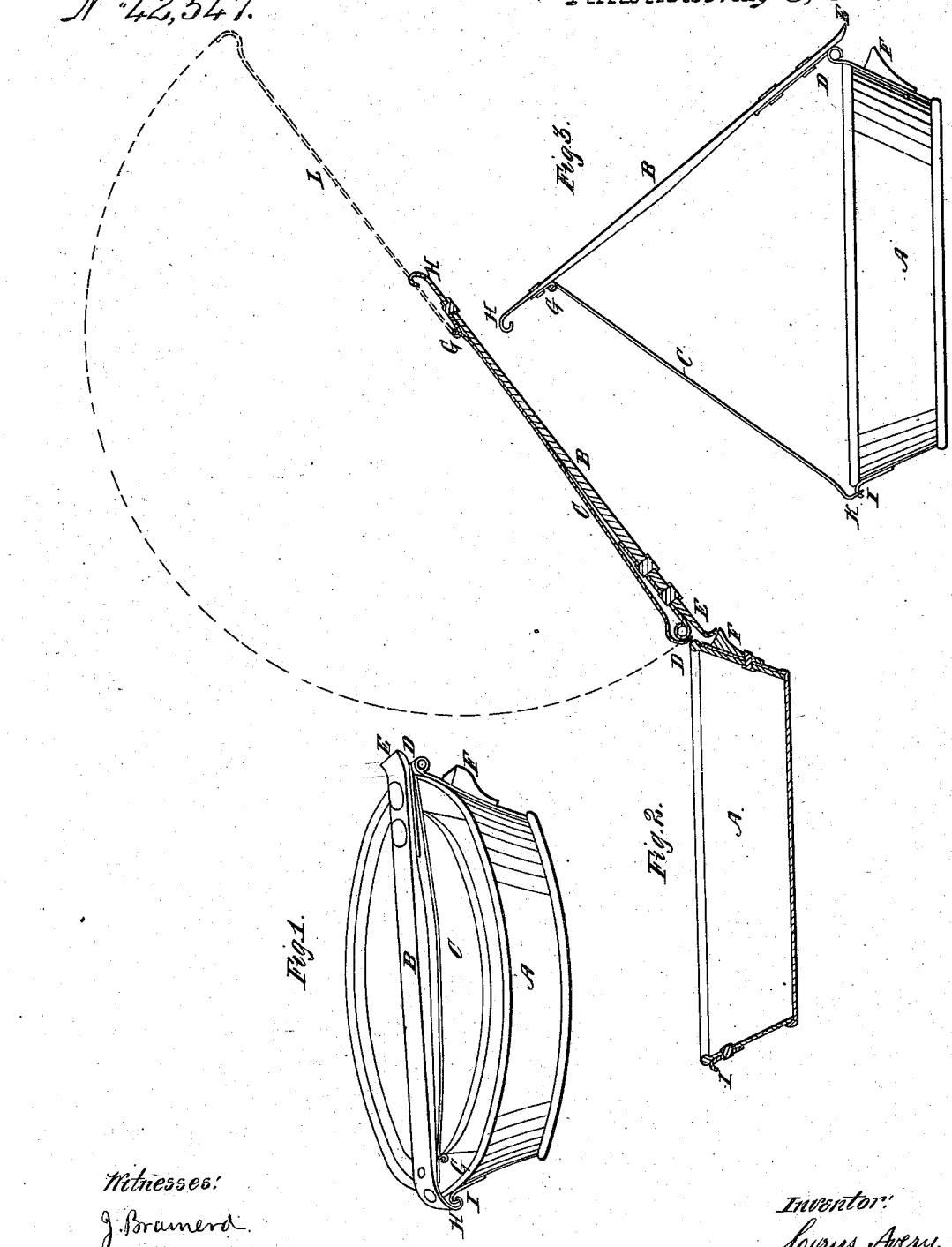

CYRUS AVERY, OF ASHTABULA, OHIO.

IMPROVEMENT IN CAMP-KETTLES.

Specification forming part of Letters Patent No. 42,547, dated May 3, 1864.

*To all whom it may concern:*

Be it known that I, CYRUS AVERY, of Ashtabula, in the county of Ashtabula and State of Ohio, have invented new and useful Improvements in Combined Frying-Pan and Kettle for Camp Service; and I do hereby declare that the following is a full and complete description of the construction and operation of the same, reference being had to the accompanying drawings, making part of this specification, in which—

Figure 1 is a perspective view. Fig. 2 is a longitudinal section, and Fig. 3 is a side view.

Like letters refer to like parts.

The nature of my invention relates to such a construction of the frying-pan that the handle can be converted at pleasure into a bail, thus forming a kettle, the structure being also such that when not needed for use it can be folded up, as seen in Fig. 1, for convenience of carrying when not in use. Various culinary articles can be stowed away in the pan—for example, tin plates, spoons, knife and fork, and various other things, and secured by the handle being folded as in Fig. 1.

The pan is constructed in the usual form and size, except it should be an inch deeper—say in all three inches. The body of the pan is shown at A in the several views. The handle is formed in two sections, B and C. The section B is hinged to the body of the pan, as seen at D. The end of the handle extends beyond the pin of the hinge D, as seen at E, about half an inch, and is curved outward, as seen in the several views, for the purpose hereinafter stated. The hinge is also provided with a projection F, against which the end of the handle impinges when it is opened or brought into the position shown in Fig. 2, and by passing the dead center is held firmly in place, so that the handle becomes rigid. If the end of the handle wears off by use, a single blow with a hammer will extend it by straightening the curved end. The section C of the handle is hinged to the section B at G near the outer end and upon the inner or upper side. When folded down upon section B, as seen in Fig. 2, the free end hooks around the joint of the hinge D. The length of each section about equals the diameter of the pan. The free end of section B is turned over in the form of a hook, H, and upon the side of the pan opposite the hinge D is a catch, I, which serves the double purpose of holding down the handle, as seen in Fig. 1, and of hooking into the free end of section C, as seen at K in Fig. 3, to form the bail when it is desirable to use the pan for a kettle. A chain may be used instead of section C. The section C may be extended, as seen and indicated by the dotted lines L in Fig. 2, thus making the handle longer.

The various modes of use are so obvious that a particular description is unnecessary.

What I claim as my improvement, and desire to secure by Letters Patent, is—

The herein-described combined pan and kettle when the several parts are constructed, arranged, and operating as and for the purpose herein specified.

CYRUS AVERY.

Witnesses:
J. BRAINERD,
A. W. McCLELLAND.